United States Patent

Roberts et al.

[15] 3,649,756

[45] Mar. 14, 1972

[54] GENERATOR OF BINARY-CODED REPRESENTATIONS OF SYMBOLS

[72] Inventors: Henry Roberts, Fair Lawn; Arthur R. Weirgin, New Milford, both of N.J.; Richard V. Scala, Middletown, N.Y.

[73] Assignee: Computer Transceiver Systems, Inc., Paramus, N.J.

[22] Filed: Dec. 16, 1970

[21] Appl. No.: 98,785

[52] U.S. Cl. ....................178/23 A, 340/365

[51] Int. Cl. ....................H04l 1/00

[58] Field of Search ....................178/23 A, 23 R; 340/146.1, 340/345

[56] References Cited

UNITED STATES PATENTS 3,593,281 7/1971 Van Duuren ....................178/23 A 3,418,630 12/1968 Van Duuren ....................178/23 A

*Primary Examiner*—Kathleen H. Claffy
*Assistant Examiner*—Horst F. Brauner
*Attorney*—Hane, Baxley & Spiecens

[57] ABSTRACT

A binary-code generator includes a five-stage binary counter and a modulo-five counter connected in cascade. The input of the binary counter is driven, via a pulse repetition rate divider, from a source of periodically recurring pulses. The binary counter monotonically cycles through its 32 states to generate 32 different coded combinations of bits and steps the modulo-five counter which steps through five states. These five states only generate four different coded combinations since two of the states generate the same coded combination. The coded combinations of bits are fed to a shift register in parallel and are then transmitted therefrom serially.

5 Claims, 1 Drawing Figure

PATENTED MAR 14 1972 3,649,756
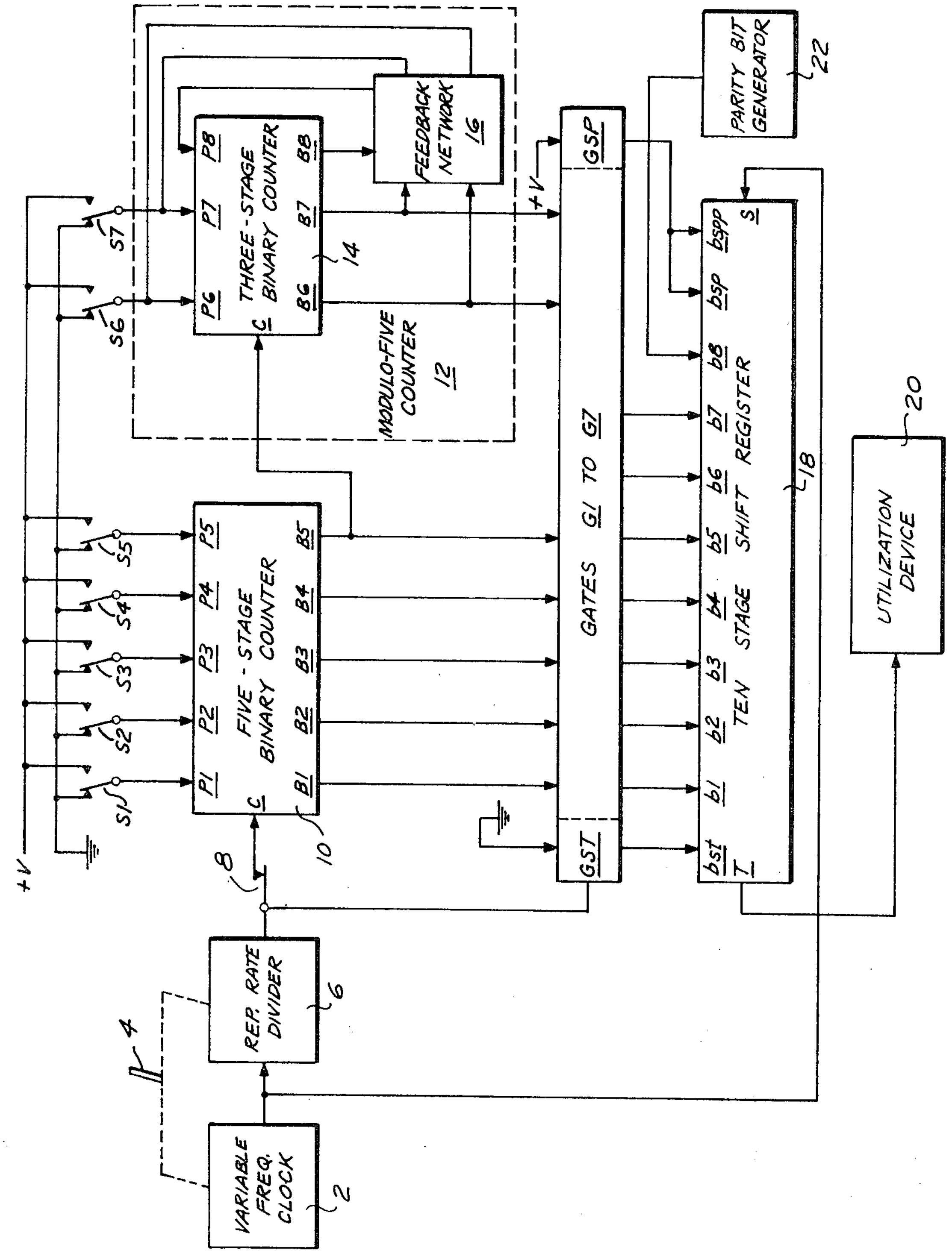
INVENTORS
HENRY ROBERTS
ARTHUR R. WEIRGIN
BY RICHARD V. SCALA
Hane, Baxley and Spiecens
ATTORNEYS

GENERATOR OF BINARY-CODED REPRESENTATIONS OF SYMBOLS

This invention pertains to code generators and, more particularly, to such generators which produce sets of binary-coded groups of signals representing symbols for testing equipment.

Most digital data communication equipment utilizes binary coding to represent the symbols, such as alphanumerics, which are handled by the equipment. Of the many classes of such equipment, the digital data terminal is gaining more and more prominence. This terminal which is usually connected to a data link generally includes an input keyboard and an output printer along with a modulating and demodulating section. When a key is depressed a binary-coded group of signals is transmitted. When a binary-coded group of signals is received by the terminal, the group is decoded to activate the printer to print the symbol represented by the group. Experience has shown that the printer and its associated circuitry is one of the weakest links in the system. Therefore, it becomes necessary to periodically test the operation of the printer. While standard manual keyboard methods can be used, automatic test generators which scan through the entire set of binary-coded representations of the symbols are highly desirable. While there are such test generators available, they have one serious drawback. The set of symbols exceeds the number of alphanumerics that can be printed on one line of the output medium. For example, a type symbol set includes 95 symbols and a typical printed line can contain a maximum of 80 symbols. Clearly, when one wishes to print the entire symbol set repetitively, there must be two carriage returns per set, one after the 80th symbol and one at the end of the set. The first possible solution is to force the codes for the carriage return after the 80th and 95th symbols. Such a solution creates two further problems. The test generator must include symbol-counting circuitry and unless the flow of codes is stalled after the carriage return code several symbols will be lost during the flyback time of the print head.

It is a general object of the invention to provide such a test generator which requires the minimum of equipment while solving the carriage return problem.

Since present day digital data communication devices utilize the USA Standard Code for Information Interchange (hereinafter called the ASCII code) and since the solution to the problem exploits features of the ASCII code, this code will now be discussed.

If a parity bit is ignored, the ASCII code utilizes all 128 combinations of seven bits, i.e., a matrix of eight rows and 16 columns. However, it has been found that it is better for the invention to divide the code elements into four groups of 32 code elements. In such a case, each code element is split into two parts, one part containing the bits $b_1$ to $b_5$ (the five less significant bits), the other part containing the bits $b_6$ and $b_7$ (the two more significant bits). The usual ASCII division is into a part containing bits $b_1$ to $b_4$ and a part containing bits $b_5$ to $b_7$.

Now, assuming the bits are positioned with bit $b_1$ ( the least significant on the left), the ASCII code will be analyzed. Elements 0000000 to 1111100 are all control codes which are never printed. These elements comprise the first two columns of the ASCII matrix but only the first column of the invention's matrix. It should be strongly noted that all of these elements are control codes and not symbol codes. That is, they are used to control an operation of a device instead of representing a symbol. For example, the element 0001000 controls a printer to back-space while the code element 1011000 controls a printer to carriage-return. The code elements from 0000010 to 1111110 form the second column of the invention's matrix. All of these code elements but element 0000010 (space control code) represent symbols to be printed. The code elements 0000001 to 1111101 of the third column of the invention's matrix represent symbols to be printed as do the code elements 0000011 to 1111111 of the fourth column of the invention's matrix. Now, it can be seen that in each column the first part of the code elements monotonically range from the value 00000 to 11111 and that the second part of each code element has one of the four values 00; 10; 01; or 11. Thus, the first column can be designated by the values 00, the second by the value 10, the third by the value 01 and the fourth by the value 11. Of these values, the value 00 represents control codes that are not printed and, most importantly, includes the carriage return control code.

One could then build a test generator utilizing a five-stage binary counter which continuously counts modulo 32 to generate the values 00000 to 11111 of the first part of the code elements. The overflow output of this counter could then drive a two-stage counter, a modulo-four counter, to generate the values: 00; 01; 10; and 11. In this way, all the elements would be generated. However, the carriage return problem would still exist. Therefore, the invention proposes that the second counter be a modulo-five counter which cyclically generates the values: 00; 10; 00; 01; and 11. It should be noted that the value 00 is generated twice in each cycle and that the two occurrences of the value 00 are separated by at least the occurrence of one of the other values. It should also be noted that the occurrence of the carriage return control code is followed by 19 control codes before the first symbol code is reached. Therefore, no printable characters will be lost during the flyback time of the print head.

Other objects, as well as the features and advantages of the invention will be apparent from the following detailed description of the invention when read with the accompanying drawing whose sole FIGURE shows, in block diagram form, apparatus for realizing the invention.

In the drawing, a variable-frequency clock pulse source or clock is switchable to operate at a first repetition rate or a second repetition rate as selected by switch 4. The output of clock 2 is fed to pulse repetition rate divider 6 whose division rate is also controlled by switch 4. For the first clock rate the divider 6 can emit one pulse for each 10 received and for the second clock rate the divider 6 can emit one pulse for each 11 received. These divider ratios correspond to the standard ASCII 10 or 11 bits per character formats. The variable clock rate permits the generation of elements at two different speeds to test a printer for marginal or other conditions. As a minimum condition, since there are seven bits per element, the divider need only divide by seven. However, as will hereinafter become apparent, division by 10 or 11 is utilized. The output of divider 6 is fed via switch 8 to the count or "add one" input C of five-stage binary counter 10. Each stage of counter 10 has one of the outputs B1 to B5, respectively. Counter 10 counts modulo 32 so that the five bits of the less significant part of a code element are present in parallel on outputs B1 to B5. The output B5 of the most significant stage of counter 10 (the overflow output) is fed to the input of modulo-five counter 12.

Modulo-five counter 12 can comprise three-stage binary counter 14 and feedback network 16. Counter 14 has a count input C. Each of the stages of counter 14 has one of the outputs B6, B7 or B8 and has one of the presetting inputs P6, P7 or P8. Feedback network 16 decodes the bits on outputs B6, B7 and B8 and feeds appropri te signals via the presetting inputs P6, P7 and P8 to constrain counter 14 to count as follows: 000; 100; 001; 011; 111; 000; 100; ... so that the B6 and B7 outputs transmit in parallel the bits 00; 10; 00; 01; 11; 00; 10; ...

Each of outputs B1 to B7 of the stages of the counters 10 and 14 is fed to one input of the two-input AND-gates G1 and G7. The other input of each AND gate is connected to the output of divider 6. The outputs of each of the gates G1 to G7 is fed to a different one of the loading inputs *b*1 to *b*7, respectively, of 10-stage shift register 18. The positional significance of the stages is least significant to the left as shown in the drawing.

It should be borne in mind that the AND gate function may also be an integral, self-contained function of some shift registers.

In order to simulate the usual data communication wherein each element is preceded by a start bit (usually "1") and either one or two stop bits (usually "0"), the 10 stages of the shift register are assigned as follows. The first stage, i.e., the stage nearest the output, contains the start bit and is set to "1", via load input *b*ST, by the output of two-input AND-gate GST whose first input is grounded and whose second input is connected to divider 6. Each of the next seven stages is connected sequentially to a different one of the load inputs *b*1 to *b*7. The ninth and tenth stages are connected via their load inputs *b*SP and *b*SPP, to the output of two-input AND-gate GSP whose first input is connected to voltage source +V and whose second input is connected to the output of divider 6. The shift pulse input S of the shift register 18 is connected to the output of clock 2 while the output T of the shift register can be connected to a utilization device 20.

Since the utilization device 20 forms no part of the invention it will not be described in detail. It can be a printer responsive to the coded elements.

Operation of the apparatus will be described assuming the lower of the two clock rates. Switch 4 is positioned to cause clock 2 to generate the lower clock rate and at the same time it sets the divider 6 to divide by 11. Thus, divider 6 emits a pulse for every 11 clock pulses. The pulse from divider 6 increases the overall count in the counters 10 and 14 by one and opens all the AND-gates G. The trailing edge of this pulse is used to parallel-load the shift register 18 with the new 11-bit code element which is shifted out serially by the next 11 clock pulses whereafter the cycle is repeated. For each such cycle a different code element is generated because the count in the counters changes by one. In this example, the code element includes a start bit and two stop bits.

For the faster clock rate, divider 6 divides by 10 and the second stop bit is not transmitted. Except for this one point, the operation is the same as described above.

In order to add to the versatility of the test generator so that it can repetitively generate the same code element, each of the stages of counter 10 is provided with one of the preset inputs P1 to P5. The movable contact of each of the single-pole double-throw switches S1 to S7 is connected to a different one of the preset inputs P1 to P7 of counters 10 and 14. One fixed input of each switch is connected to ground (representing "1") while the other input is connected to +V (representing "0"). To repetitively generate the same code element, the coding for the code element is set up by appropriately setting the switches S1 to S7 and opening switch 8. Thus, a fixed count is set in the counters 10 and 14.

Since the various blocks are well-known devices, they will not be described in detail. Clock 2 can be a free-running pulse generator whose frequency can be switched between two different values, divider 6 can be an 11 stage ring counter with the facility to bypass one of the stages. The counters, AND gates and the shift register are standard off-the-shelf items, while the feedback network can be an array of AND gates to decode the appropriate counts.

Bit 8 which is the parity bit can be set to be always a "1", always a "0" or be always odd or always even. Should it be desired that the parity bit be always odd or always even then a circuit which examines bits 1 through 7 and determines whether their sum is odd or even can be used to control the sense of *b*8, identified on the drawing as coming from parity bit generator 22.

While specific hardware has been shown, the invention is not limited to such hardware. For example, shift registers are available which include the input gating. Furthermore, parity bit generators can be included to add a parity bit to the code elements.

While only one embodiment of the invention has been shown and described in detail there will now be obvious to those skilled in the art many modifications and variations satisfying the objects of the invention but which do not depart from the spirit thereof as defined by the appended claims.

What is claimed is:

1. Apparatus for generating the binary-coded representations of symbols wherein each symbol is represented by a more significant and a less significant group of bits, said more significant group comprising at least two bits and said less significant group comprising five bits, said apparatus comprising: a source of periodically recurring pulses; a pulse repetition rate divider, connected to receive pulses from said source, for transmitting one pulse for at least each seven pulses received; a five-stage binary counter for counting and accumulating pulses, the least significant stage of said binary counter receiving the pulses from said pulse repetition rate divider, each of said stages having an output; a modulo-five counter; said modulo-five counter having an input connected to the output of the most significant stage of said five-stage binary counter and two outputs, said modulo-five counter including feedback means for controlling said counter to cycle through five states wherein two of said states cause the transmission of the same coded combination of two bits by said two outputs and the other three of said states cause the transmission of different coded combinations of two bits by said two outputs, said two states being separated by at least one of said other three states; a shift register having at least seven stages, a shifting input and an output, said shifting input receiving pulses for shifting bits stored in said shift register serially from said output, and each of the stages of said shift register having an input whereby said stages can receive bits in parallel; means for connecting said source of periodically recurring pulses to the shifting input of said shift register; and means connecting each of the outputs of said five-stage binary counter and said modulo-five counter to the inputs of the different stages, respectively, of said shift register for transferring the contents of said counters to said shift register under control of the pulses transmitted by said pulse repetition rate divider.

2. The apparatus of claim 1 wherein said pulse repetition rate divider transmits one pulse for at least each eight pulses received and said shift register has at least eight stages, seven stages of said shift register receiving bits from said counters and further comprising means to preset the eighth stage to a particular bit value.

3. The apparatus of claim 1 wherein said pulse source is controllable to operate at a first rate or second rate, said pulse repetition rate divider is controllable to divide by at least nine, said shift register has at least 10 stages and further comprising means for presetting the stage adjacent to the output of said shift register to one of the two possible bit values and means for presetting the two stages most remote from said output to the other of the two possible bit values.

4. The apparatus of claim 1 further comprising means for preventing the first stage of said five-stage binary counter from receiving pulses from said pulse repetition rate divider, and means for presetting the stages of said counters whereby the binary-coded representation of the same symbol is continuously generated.

5. The apparatus of claim 3 further comprising means for preventing the first stage of said five-stage binary counter from receiving pulses from said pulse repetition rate divider, and means for presetting the stages of said counters whereby the binary-coded representation of the same symbol is continuously generated.

* * * * *